United States Patent [19]

Cuscurida et al.

[11] Patent Number: 4,479,010

[45] Date of Patent: Oct. 23, 1984

[54] PROCEDURE FOR THE ALKOXYLATION OF POLYOXYALKYLENEAMINES

[75] Inventors: Michael Cuscurida, Austin; Walter P. Krause, Georgetown, both of Tex.

[73] Assignee: Texaco Inc., White Plains, N.Y.

[21] Appl. No.: 515,406

[22] Filed: Jul. 20, 1983

[51] Int. Cl.³ .............................................. C07C 85/00
[52] U.S. Cl. ................................................... 564/477
[58] Field of Search ....................................... 564/477

[56] References Cited

U.S. PATENT DOCUMENTS

| | | | |
|---|---|---|---|
| 2,823,236 | 2/1958 | Lowe et al. | 564/477 |
| 3,255,253 | 6/1966 | Kuryla | 564/477 X |
| 3,301,888 | 1/1967 | Cyba | 564/447 X |
| 3,551,461 | 12/1970 | Thayer | 564/477 X |
| 3,927,104 | 12/1975 | Miller et al. | 564/477 X |
| 4,323,709 | 4/1982 | Kwong | 564/477 X |
| 4,329,505 | 5/1982 | Kwong et al. | 564/477 X |

FOREIGN PATENT DOCUMENTS 914850 11/1972 Canada ................................ 403/35

Primary Examiner—Paul F. Shaver
Attorney, Agent, or Firm—Jack H. Park; Kenneth R. Priem; David L. Mossman

[57] ABSTRACT

A non-catalytic procedure for reacting polyoxyalkyleneamines with alkylene oxides in the presence of 5 to 15 wt. % water is described. With this inventive procedure the addition of the oxides may be done quickly and at the surprisingly low temperature of between 75 and 85° C. The proportion of tertiary amine in the resulting product ranges between 90 and 100% indicating essentially total alkoxylation. This technique is particularly suitable for propoxylation which is difficult to achieve by conventional means.

13 Claims, No Drawings

PROCEDURE FOR THE ALKOXYLATION OF POLYOXYALKYLENEAMINES

CROSS-REFERENCE TO RELATED APPLICATION

This application is related to U.S. patent application Ser. No. 515,405, relating to partial alkoxylation of polyoxyalkyleneamines, filed of even date.

BACKGROUND OF THE INVENTION

1. Field of the Invention

The invention relates to methods for the alkoxylation of polyoxyalkyleneamines and more particularly relates to non-catalytic methods for alkoxylating polyoxyalkyleneamines at low temperatures in the presence of water.

2. Other Methods in the Field of the Invention

The general concept of alkoxylating polyoxyalkyleneamines is well known. However, the higher molecular weight polyoxyalkyleneamines react with higher oxides, such as propylene oxides, only with great difficulty, requiring high temperatures and long reaction times. Even under these conditions, it is quite difficult to prepare products having a tertiary amine content of greater than 90% (considered totally alkoxylated).

A number of schemes for alkoxylation have been developed. U.S. Pat. Nos. 2,902,478 and 3,865,806 both describe techniques for reacting initiators having 4 to 8 active hydrogens with alkylene oxides in the absence of added water but using trialkylamines as catalysts for the reaction. The reaction temperature for this method range from 70° to 160° C., preferably 80° to 90° C. Alkylene oxides may also be added to the reaction product of phenol, alkanolamine and formaldehyde according to U.S. Pat. No. 3,297,597. Here the process is performed in the absence of water at a temperature in the range from 30° to 200° C., although all of the examples therein are conducted at temperatures of 90° C. or higher.

Another catalytic method is described in U.S. Pat. No. 4,075,130 where polyoxypropylene polyamines of 190 to 3,000 molecular weight may be reacted with alkylene oxides in the presence of acidic or basic catalysts at a temperature in the range of 50° to 200° C., apparently in the absence of water. These materials are subsequently used as defoaming agents. Aqueous ammonia is used as a catalyst for this reaction conducted at 40° to 120° C. according to the method of U.S. Pat. No. 4,166,172.

Non-catalytic methods include Canadian Pat. No. 914,850 which details the reaction of polyoxyalkylene polyamines with alkylene oxides at 125° to 170° C. in the absence of water.

It would be advantageous to have a method for alkoxylating polyoxyalkyleneamines at low temperatures, in the absence of a catalyst to give a product having greater than 90% of the amine functions as tertiary amines.

SUMMARY OF THE INVENTION

The invention concerns a method for alkoxylating polyoxyalkyleneamines where the first step is adding at least one alkylene oxide to an aqueous polyoxyalkyleneamine. The alkylene oxide should have 2 to 4 carbon atoms, and the polyoxyalkyleneamine has a molecular weight of from 200 to 5,000. The proportion of water ranges from 5 to 15 wt.% based on the polyoxyalkyleneamine present, and the addition is conducted at a temperature in the range between about 75° and 85° C. Subsequently, the reactant mixture is digested at a temperature at or above 75° C. to give an alkoxylated polyoxyalkylene product having a tertiary amine content of from 90 to 100%.

DETAILED DESCRIPTION OF THE PREFERRED EMBODIMENTS

The polyoxyalkyleneamine reactants of this invention are well known. They may be made by treating the corresponding polyoxyalkylene polyols with ammonia and hydrogen over a catalyst prepared by the reduction of a mixture of the oxides of nickel, copper and chromium. For more details on the preparation of the polyoxyalkyleneamines used herein, see U.S. Pat. No. 3,654,370, incorporated by reference herein. A particularly popular brand of amines are the JEFFAMINE ® polyoxypropyleneamines sold by Texaco Chemical Company.

The technique of this invention is particularly useful for the higher molecular weight amines. The polyoxyalkylene polyamines should have molecular weights in the range of 200 to 5,000 and preferably in the range of 2,000 to 5,000. Preferably, the "alkylene" moiety has between 2 and 4 carbon atoms such as ethylene, propylene and 1,2-butylene.

Permissible alkylene oxide reactants include any alkylene oxide having from 2 to 4 carbon atoms, preferably ethylene oxide, propylene oxide and 1,2-butylene oxide and mixtures thereof. Especially preferred are propylene oxide alone or together with ethylene oxide. Although the method works well with only ethylene oxide, the real advantage is in the addition of propylene oxide since propylene oxide cannot be added well by any other technique.

An alternate embodiment of the invention involves first adding a small amount of ethylene oxide to the polyoxyalkyleneamine (from 0.25 to 10 wt.% total alkylene oxide charge), and then in a separate subsequent step finishing the reaction by adding propylene oxide under identical reaction conditions. Digestion takes place after the addition of both oxides.

The amount of alkylene oxide added to the amine reactant depends on the desires of the experimenter. In the examples herein using diamines and triamines, four moles of oxide is all that can be added. Preferably, an excess of oxide should be used to ensure total alkoxylation, with the unreacted alkylene oxide being stripped off.

From about 5 to 15 wt.% water must be present, based on the quantity of amine reactant. Polyoxyalkyleneamine already in aqueous solution is permissible, otherwise the water should be added.

Generally, the reaction is conducted by first adding water to the polyoxyalkyleneamine and then adding and reacting the alkylene oxide at an elevated temperature. The temperature of the addition step should be in the range from 75° to 85° C., which is surprisingly low when compared to some of the prior art methods. It is also unusual that the alkylene oxide can be introduced rather quickly, in less than half an hour, whereas in prior methods the period of addition is typically ten hours.

Subsequent digestion of the reactants generally occurs at a temperature in the range of about 75° to 135° C. for about three hours, although the time is not critical. This digestion temperature is surprisingly low compared to the prior art. The desired product is usually separated out by stripping. Note that no catalyst is used during the process.

The reaction may be conducted in either a batch or continuous mode. Pressures in the range from ambient to 100 psig are permissible. The procedure of this invention also appears applicable for the alkoxylation of alkyl polyoxyalkyleneamines and amination products of propoxylated fatty alcohols in the 300 to 1,000 molecular weight range.

A surprising result of this invention is that the resulting materials contain a high proportion of tertiary amines. Of the total amines present, 90 to 100% of them are tertiary amine groups, a criteria that is used to indicate that the polyoxyalkyleneamine is totally alkoxylated. Another surprising result is that few glycol by-products are formed under these reaction conditions.

Tertiary amine groups are well known for their catalytic properties for the reaction of polyols and polyisocyanates to make polyurethanes. The products of this invention can serve as crosslinkers in the preparation of urethane foams, elastomers and adhesives. For more details on the production of polyurethane foams, an example of which will be presented herein, see U.S. Pat. No. 3,297,597, incorporated by reference herein, among others.

The invention will be further illustrated by the following examples which are not intended to limit the invention.

EXAMPLE I

This example will illustrate a prior art method for alkoxylation of a 2,000 molecular weight polyoxyalkyleneamine (JEFFAMINE D-2000; Texaco Chemical Co.)

Into a ten gallon kettle was charged 40 pounds of JEFFAMINE D-2000. The reactor was then evacuated and purged with prepurified nitrogen. Water (one pound) was then charged into the kettle. Propylene oxide (6.0 lb) was then reacted at 170°–175° C. at 60 psig over a ten hour period. After digestion, the reaction mixture was stripped to a minimum pressure, cooled to 100° C. and drained from the kettle. The finished product had the following properties.

| Properties | |
|---|---|
| Total acetylatables, meq/g | 1.82 |
| Total amines, meq/g | 0.911 |
| Tertiary amine, meq/g | 0.804 |
| Primary amine, meq/g | <0.01 |
| Water, wt. % | 0.05 |

EXAMPLE II

This example illustrates the method of this invention.

Into a one gallon kettle was charged 1000 g of JEFFAMINE D-2000. The reactor was then evacuated and purged with prepurified nitrogen. Water (10 g) was then charged into the reactor. Ethylene oxide (25 g) was then reacted at 80° C. at 22 psig. Propylene oxide (227 g) was then added at 80° C. at 33 psig. Only 20 minutes was required for addition of the ethylene oxide and propylene oxide. The reaction mixture was then digested for three hours at 127°–136° C. The product was then stripped at 100° C. to a minimum pressure, nitrogen stripped for one-half hour, and drained from the kettle. The finished product had the following properties:

| Properties | |
|---|---|
| Total amine, meq/g | 0.88 |
| Primary amine, meq/g | 0.01 |
| Secondary amine, meq/g | <0.01 |
| Tertiary amine, meq/g | 0.90 |

The above product was analyzed for ethylene glycol, diethylene glycol and propylene glycol using gel permeation chromatography. It was found to contain <0.4% ethylene glycol, 0.47% diethylene glycol and no propylene glycol.

It should be noted that all of the amine groups are tertiary amine (100%), whereas in Example I the tertiary amine proportion is only 88%.

EXAMPLE III

This example will illustrate the propoxylation of JEFFAMINE D-2000 using the reaction conditions of this invention.

Into a one gallon kettle was charged 1000 g JEFFAMINE D-2000. The reactor was then evacuated and purged with prepurified nitrogen. Water (100 g) was then added to the reactor. Propylene oxide (126 g) was then reacted at 80°–82° C. at 28 psig. Only 15 minutes was required for addition of the propylene oxide. The reaction mixture was then digested three hours at 126° C. The product was then stripped to a minimum pressure, nitrogen stripped and drained from the kettle. The finished product had the following properties:

| Properties | |
|---|---|
| Total acetylatables, meq/g | 1.76 |
| Total amine, meq/g | 0.87 |
| Primary amine, meq/g | 0.02 |
| Secondary amine, meq/g | 0.09 |
| Tertiary amine, meq/g | 0.78 |

The tertiary amine proportion is about 90%.

EXAMPLE IV

The following example will illustrate this invention in the alkoxylation of a partially aminated 5,000 molecular weight glycerin-based polyoxypropylene triol. The partially aminated polyol (JEFFAMINE T-5000) contained 0.55 meq/g total acetylatables and had a total amine content of 0.48 meq/g and a primary amine content of 0.43 meq/g.

Into a one gallon stirred autoclave was charged 1200 g of JEFFAMINE T-5000 and 120 g of water. The reactor was then evacuated and purged with prepurified nitrogen. Ethylene oxide (14 g) was then reacted at 80°–85° C. and the reaction mixture digested five minutes. Propylene oxide (120 g) was then reacted at 80°–85° C. at a maximum pressure of 24 psig. The reaction mixture was then digested two hours at 80°–85° C. This was followed by a three hour digestion at 125° C. The reaction mixture was then stripped to a minimum pressure at 125° C., nitrogen stripped and polish filtered. The finished product was a light yellow viscous liquid with the following properties.

| Properties | |
|---|---|
| Total acetylatables, meq/g | 0.95 |

| Properties | |
|---|---|
| Total amine, meq/g | 0.44 |
| Primary amine, meq/g | <0.01 |
| Secondary amine, meq/g | 0.02 |
| Tertiary amine, meq/g | 0.41 |

The tertiary amine content is about 93%.

EXAMPLE V

This example will illustrate the use of the alkoxylated partially aminated polyol from Example IV in the preparation of flexible urethane foam. It will further show that replacement of a standard urethane polyol with incremental quantities of the products of this invention serves to increase the load bearing properties of the foams. The load bearing properties were measured with a Chatillon gauge (Manual Model LIC Compression Tester manufactured by John Chatillon and Sons).

| | A | B | C |
|---|---|---|---|
| Formulation, pbw | | | |
| THANOL ® F-3016[1] | 100 | 90 | 75 |
| JEFFAMINE T-5000 + EO/PO | — | 10 | 25 |
| Water | 4.0 | 4.0 | 4.0 |
| L-6202 silicone[2] | 1.0 | 1.0 | 1.0 |
| T-10 catalyst[3] | 0.5 | 0.5 | 0.5 |
| THANCAT ® TD-33[4] | 0.3 | 0.3 | 0.3 |
| Toluene diisocyanate | 49.7 | 49.7 | 49.7 |
| Isocyanate index | 1.05 | 1.05 | 1.05 |
| Details of Preparation | | | |
| Cream time, seconds | 12 | 12 | 12 |
| Rise time, seconds | 80 | 78 | 83 |
| Properties | | | |
| Appearance | Good | | |
| Density, pcf | 1.64 | 1.57 | 1.57 |
| Chatillon gauge (reading at 33% indentation, lb) | 5.0 | 5.2 | 5.35 |

[1]3000 molecular weight propylene oxide/ethylene oxide adduct of glycerin; Texaco Chemical Co.
[2]Silicone surfactant; Union Carbide Chemical Corp.
[3]50% stannous octoate in dioctyl phthalate; M & T Chemicals.
[4]33% triethylenediamine in propylene glycol; Texaco Chemical Co.

Many modifications may be made in the method of this invention without departing from the spirit and scope thereof which are defined only by the appended claims. For example, one skilled in the art could modify the modes of addition, reactant proportions, water amount and reaction temperature to optimize the process.

We claim:

1. A method for alkoxylating polyoxyalkyleneamines comprising
   a. adding at least one alkylene oxide to an aqueous polyoxyalkyleneamine where
      (1) the alkylene oxide has from 2 to 4 carbon atoms,
      (2) the polyoxyalkyleneamine has a molecular weight of from 200 to 5,000,
      (3) the proportion of water ranges from 5 to 15 wt.% based on the polyoxyalkyleneamine quantity, and
      (4) the addition is conducted at a temperature between about 75° and 85° C., and
   b. digesting the mixture of oxide and polyoxyalkyleneamine at a temperature between about 75° C. and 135° C. to give an alkoxylated polyoxyalkyleneamine product having a tertiary amine content of from 90 to 100%.

2. The method of claim 1 in which the polyoxyalkyleneamine reactant has a molecular weight in the range from 2,000 to 5,000.

3. The method of claim 1 in which the polyoxyalkyleneamine reactant is selected from the group consisting of polyoxypropylene diamines and polyoxypropylene triamines.

4. The method of claim 1 in which the alkylene oxide is chosen from the group consisting of propylene oxide, ethylene oxide and mixtures thereof.

5. The method of claim 1 in which the addition step of alkylene oxide to the aqueous polyoxyalkyleneamine is completed in less than half an hour.

6. A method for alkoxylating polyoxyalkyleneamines comprising
   a. adding an alkylene oxide component to an aqueous polyoxyalkyleneamine where
      (1) the alkylene oxide component is selected from the group consisting of propylene oxide and a mixture of propylene oxide and ethylene oxide,
      (2) the polyoxyalkyleneamine has a molecular weight of from 2,000 to 5,000,
      (3) the proportion of water ranges from 5 to 15 wt.% based on the polyoxyalkyleneamine quantity, and
      (4) the addition is conducted at a temperature between 75° and 85° C.
   b. digesting the mixture of oxide component and polyoxyalkyleneamine at a temperature between about 75° and 135° C. to give an alkoxylated polyoxyalkyleneamine product having a tertiary amine content between 90 to 100%.

7. The method of claim 6 in which the polyoxyalkyleneamine reactant is selected from the group consisting of polyoxypropylene diamines and polyoxypropylene triamines.

8. The method of claim 6 in which the alkylene oxide component addition step is completed in less than half an hour.

9. A method for alkoxylating polyoxyalkyleneamines comprising
   a. adding ethylene oxide to an aqueous polyoxyalkyleneamine where
      (1) the polyoxyalkyleneamine has a molecular weight of from 200 to 5,000,
      (2) the proportion of water ranges from 5 to 15 wt.% based on the polyoxyalkyleneamine quantity,
      (3) the addition is conducted at a temperature between 75° and 85° C., and
      (4) the amount of ethylene oxide is about 0.25 to 10 wt.% of the total alkoxide proportion to be added,
   b. subsequently adding propylene oxide to the reactant mixture under identical conditions as in step a. and
   c. digesting the mixture of reactants at a temperature between about 75° C. and 135° C. to give an alkoxylated polyoxyalkyleneamine product having a tertiary content of from 90 to 100%.

10. The method of claim 9 in which the polyoxyalkyleneamine reactant has a molecular weight in the range from 2,000 to 5,000.

11. The method of claim 9 in which the polyoxyalkyleneamine reactant is selected from the group consisting of polyoxypropylene diamines and polyoxypropylene triamines.

12. The method of claim 9 in which the addition steps a. and b. are each completed in less than half an hour.

13. The method of claim 9 in which an excess of total alkylene oxide component is used with respect to the polyoxyalkyleneamine quantity.

* * * * *